(12) United States Patent
Elahi et al.

(10) Patent No.: US 10,961,977 B2
(45) Date of Patent: Mar. 30, 2021

(54) VARIABLE GUIDE BEARING

(71) Applicant: Andritz Hydro Canada Inc., Peterborough (CA)

(72) Inventors: Sarmad Elahi, Peterborough (CA); Shawn Wale, Peterborough (CA); Ryan Byrne, Peterborough (CA); Andrew Wodoslawsky, Peterborough (CA)

(73) Assignee: ANDRITZ HYDRO CANADA INC., Peterborough (CA)

( * ) Notice: Subject to any disclaimer, the term of this patent is extended or adjusted under 35 U.S.C. 154(b) by 0 days.

(21) Appl. No.: 16/664,153

(22) Filed: Oct. 25, 2019

(65) Prior Publication Data

US 2020/0132042 A1 Apr. 30, 2020

Related U.S. Application Data

(60) Provisional application No. 62/751,033, filed on Oct. 26, 2018.

(51) Int. Cl.
| | |
|---|---|
| *F03B 11/06* | (2006.01) |
| *F03B 15/00* | (2006.01) |
| *G01B 7/14* | (2006.01) |
| *F03B 13/00* | (2006.01) |
| *H02K 5/16* | (2006.01) |

(52) U.S. Cl.
CPC ............ *F03B 15/00* (2013.01); *F03B 11/06* (2013.01); *F03B 11/063* (2013.01); *F03B 13/00* (2013.01); *G01B 7/14* (2013.01); *H02K 5/16* (2013.01)

(58) Field of Classification Search
CPC .............................. F03B 11/06; F03B 11/063
See application file for complete search history.

(56) References Cited

U.S. PATENT DOCUMENTS

| 947,242 A | 1/1910 | Kingsbury | |
|---|---|---|---|
| 1,417,652 A * | 5/1922 | Wood | F16C 23/10 |
| | | | 101/219 |
| 2,448,341 A * | 8/1948 | Yeomans | F16C 25/02 |
| | | | 384/264 |

(Continued)

FOREIGN PATENT DOCUMENTS

| CA | 2832298 A | 10/2012 |
|---|---|---|
| CN | 203743221 U | 7/2014 |

(Continued)

OTHER PUBLICATIONS

English translation of FR1368274A (Year: 1964).*

(Continued)

*Primary Examiner* — David E Sosnowski
*Assistant Examiner* — Wesley Le Fisher
(74) *Attorney, Agent, or Firm* — Kilpatrick Townsend & Stockton LLP

(57) ABSTRACT

A guide bearing system including a pad adjuster to traverse at least one bearing in a direction to adjust a radial clearance. The system can further include a sensor for measuring deviations in the radial clearance. In some embodiments, the guide bearing system includes a controller that receives a distance signal from the sensor measuring the radial clearance and signals the pad adjuster to traverse the at least one bearing to compensate for the deviations in the radial clearance.

15 Claims, 10 Drawing Sheets

(56) References Cited

U.S. PATENT DOCUMENTS

| | | | |
|---|---|---|---|
| 3,165,365 A | | 1/1965 | Wiedemann et al. |
| 3,958,492 A | | 5/1976 | Curless |
| 4,445,792 A | * | 5/1984 | Trippett ................ F16C 17/024 384/103 |
| 4,643,592 A | * | 2/1987 | Lewis .................... F16C 17/03 384/100 |
| 5,752,774 A | * | 5/1998 | Heshmat ............. F16C 32/0442 384/549 |
| 8,950,565 B2 | | 2/2015 | Adams |
| 9,066,602 B2 | | 6/2015 | Rawls-Meehan |
| 2014/0133985 A1 | | 5/2014 | Mongeau |
| 2017/0122366 A1 | | 5/2017 | Kuhlmann et al. |
| 2018/0003075 A1 | * | 1/2018 | Chasalevris ............ F16C 17/24 |

FOREIGN PATENT DOCUMENTS

| | | | |
|---|---|---|---|
| CN | 104358653 A | | 2/2015 |
| CN | 104454984 A | | 3/2015 |
| CN | 204253254 U | | 4/2015 |
| DE | 2710706 A1 | | 9/1978 |
| FR | 1368274 A | * | 7/1964 .............. F16C 37/00 |
| JP | 2005-326155 A | | 11/2005 |
| JP | 2014-25510 A | | 2/2014 |
| JP | 2019-157919 A | | 9/2019 |

OTHER PUBLICATIONS

International Search Report and Written Opinion issued in International Application No. PCT/IB2019/001158, dated Mar. 17, 2020, pp. 1-10.

Pghyden, "Maximizing Hydroelectric Turbine Performance and Reliability". Pall Power Generation; Filtration, Separation, Solution. https://www.pal.com/pall/literature-library/non-gated/PGHYDEN. 2016. pp. 1-6.

Plouffe, Gilbert; Canadian Office Action of Sep. 16, 2020, pp. 1-5.

* cited by examiner

VARIABLE GUIDE BEARING

CROSS-REFERENCE TO RELATED APPLICATION

This application claims the benefit of and priority to U.S. Provisional Patent Application No. 62/751,033, filed Oct. 26, 2018, the entire contents of which are hereby incorporated herein by reference.

BACKGROUND OF THE INVENTION

Technical Field

The present disclosure relates generally to hydrodynamic bearings with discrete guide bearing pads, and more particularly to hydrodynamic bearings used in the hydroelectric industry.

Related Art

Hydroelectric turbine-generator assemblies produce electrical energy using a renewable resource and without combusting fossil fuels. A turbine converts kinetic energy from flowing water into mechanical energy of rotation. A shaft connected to the turbine transmits the mechanical energy to a rotor assembly in a generator. The generator then converts the mechanical energy into electrical energy.

A generator may include a generator housing that encompasses the stator assembly and the nested rotor assembly. The stationary stator assembly may include multiple coils. The rotor assembly may include multiple magnets configured to rotate within the stator assembly relative to the stator coils. A small air gap separates the rotor assembly from the stator assembly. The shaft transmits mechanical energy from the turbine to rotate the rotor assembly. As the rotor assembly spins, the movement of the magnets past the stationary stator coils induces an electric current in the coils. The generated electricity may then be transferred for further processing, storage, or distribution.

Hydroelectric turbine assemblies tend to have hydrodynamic guide bearings disposed adjacent to the shaft, below and/or above the generator. A thrust bearing may also be disposed above the generator. A guide bearing may include multiple discrete guide bearing pads (or "shoes") configured to reduce friction, facilitate rotational shaft movement during operation, resist lateral forces during fault events, and to center the shaft in the shaft housing. The guide bearing pads may be disposed annularly within a shaft housing. When the shaft is present, the guide bearing pads define a radial guide bearing clearance between the guide bearing pads and the shaft. A shaft seal may be disposed below and above the guide bearing pads to contain hydrodynamic fluid (typically oil or water). The fluid fills spaces between the shaft, shaft housing, and shaft seals, including the radial guide bearing clearance. Ideally, the shaft spins against a film of fluid annularly disposed between the guide bearing pads and the rotating shaft. In operation, this fluid film is generally highly pressurized by the relative motion of the shaft to the pads in order to resist normal and fault forces and to keep the shaft centered. In practice however, the width of the radial guide bearing clearance can differ significantly depending on the bearing system's ambient temperatures.

SUMMARY

In accordance with some aspects of the present disclosure, methods, structures and computer program products are described herein that can mitigate the effects of variations in the radial guide bearing clearance between the guide bearing pads and the shaft of a turbine assembly, such as a hydroelectric turbine assembly.

In some embodiments, the problem of shaft vibrations due to distance variations in a radial guide bearing clearance in a rotating machine having a hydrodynamic bearing is mitigated by a system configured to monitor the radial clearance and to adjust a position of one or more guide bearing pads relative to the shaft while the rotating machine is active.

In one aspect, a method is provided for maintaining a radial clearance between a variable guide bearing and a shaft of a turbine. In one embodiment, the method may include measuring a baseline radial clearance between at least one guide bearing and the shaft of the turbine. A pad adjuster may be engaged to at least one guide bearing. The pad adjuster may include a prime mover in communication to at least one guide bearing through a transmission, wherein the pad adjuster actuated by a motive force from the prime mover that traverses at least one guide bearing in a direction to adjust a radial clearance. The method may further include measuring radial clearance deviations between the at least one guide bearing and the shaft of the turbine. The method also includes calculating a difference between the radial clearance deviations and the baseline radial clearance. In some embodiments, the method includes actuating the prime mover to adjust the at least one guide bearing to compensate for the difference between the radial clearance deviations and the baseline radial clearance. In some embodiments, the method is a computer implemented method.

In another aspect of the present disclosure, a guide bearing system is provided. In one embodiment, the guide bearing system can include a pad adjuster system to traverse at least one bearing in a direction to adjust a radial clearance. The radial clearance is a dimension between an outermost shaft end of the at least one bearing pad and an outermost perimeter of a shaft assembly. The system can further include a sensor for measuring deviations in the radial clearance. In some embodiments, the guide bearing system includes a controller that receives a distance signal from the sensor measuring the radial clearance and signals the pad adjuster system to traverse the at least one bearing to compensate for the deviations in the radial clearance.

In another embodiment, the guide bearing system may include a gearing system and a pad adjuster mechanically engaged to the gearing system. The pad adjuster may have a pad end distally disposed from the gearing system, wherein the pad end is engaged to a bearing pad. The guide bearing system may further include a prime mover engaging the gearing system such that the prime mover is not co-linear with a radial line disposed on a radial plane defined by the center of rotation of the shaft. A proximity sensor may be configured to detect a distance of the radial clearance between a guide bearing pad and the shaft. The proximity sensor generates a distance signal and transmits the distance signal to a control system. In some embodiments, the control system compares the distance measurement signal to a programmed range, wherein the control system sends an adjustment signal to a prime mover if the distance measurement signal does not match the programmed range. In some embodiments, the prime mover engages a gearing system worm drive engaging a worm wheel and configured to turn a worm wheel. The worm wheel may be configured to turn the pad adjuster. The pad adjuster can be configured to move the guide bearing pad along a radial plane defined by the center of rotation of the shaft.

An advantage of the exemplary system may be that the radial guide bearing clearance may be continuously monitored and adjusted in response to a thermally expanding shaft, thereby maintaining an optimal radial guide bearing clearance during startup and throughout operation of the rotating machine. Furthermore, the radial guide clearance occasionally changes abruptly during operation in response to an upset condition. An upset condition may result from hydraulic disturbances, electrical fault, applying the turbine brakes suddenly, the turbine runner encountering a large piece of debris, or some other unplanned operational event. A further advantage of the exemplary systems that are described herein may be the protection against back driving that may otherwise result from the above described upset conditions.

It has been discovered that by configuring the prime mover to engage a gearing system non-collinearly relative to the real or potential linear movement of the pad adjuster, the exemplary guide bearing adjustment system protects against unexpected back driving that could otherwise damage a bearing adjustment system or result in a loss of shaft guidance. Back driving could also close the gap between rotating and stationary components. Without being bound by theory, it is hypothesized that the non-collinear engagement may provide sufficient counter-force to overcome back driving forces. The guide bearing adjustment bolt may adjust the guide bearing pads radially towards or away from the rotating parts. Without being bounded by theory, it is believed that the order of placement of the worm drive and worm wheel service may protect the prime mover against back-driving from the guide bearing pad. In one embodiment, the prime mover provides a redundant position signal to the control system as a safety check.

In another aspect, a control system is provided that can be employed with the above described methods and structures for maintaining a radial clearance between a variable guide bearing system and a shaft of a turbine. In one embodiment, the control system may include at least one module of memory for storing baseline radial clearance values for a dimension between at least one guide bearing and the shaft of the turbine. The control system may include a receiver for receiving measured radial clearance deviations between at least one guide bearing and the shaft of the turbine. In some embodiments, the control system may further include a corrective radial clearance analyzer that employs a hardware processor for performing a set of instructions for comparing the measured radial clearance deviations to the baseline radial clearance values in providing a corrective radial clearance dimension. The control system further includes at least one signal generator in communication with a pad adjuster that traverses that at least one guide bearing in a direction to adjust a radial clearance.

In yet another aspect, a computer program product is provided that includes a computer readable storage medium having computer readable program code embodied therein for maintaining a radial clearance between a variable guide bearing and a shaft of a turbine. In one embodiment, the computer readable storage medium is non-transitory. The computer readable program code can provide the steps of measuring a baseline radial clearance between at least one guide bearing and the shaft of the turbine. A pad adjuster may be engaged to the at least one guide bearing. The pad adjuster may include a prime mover in communication to the at least one guide bearing through a transmission, wherein the pad adjuster actuated by a motive force from the prime mover traverses that at least one guide bearing in a direction to adjust a radial clearance. The method may further include measuring radial clearance deviations between the at least one guide bearing and the shaft of the turbine, and calculating a difference between the radial clearance deviations and the baseline radial clearance. In some embodiments, the method includes actuating the prime mover to adjust the at least one guide bearing to compensate for the difference between the radial clearance deviations and the baseline radial clearance.

BRIEF DESCRIPTION OF THE DRAWINGS

The foregoing will be apparent from the following more particular description of exemplary embodiments of the disclosure, as illustrated in the accompanying drawings in which like reference characters refer to the same parts throughout the different views. The drawings are not necessarily to scale, with emphasis instead being placed upon illustrating the disclosed embodiments.

DETAILED DESCRIPTION

Figure 1:
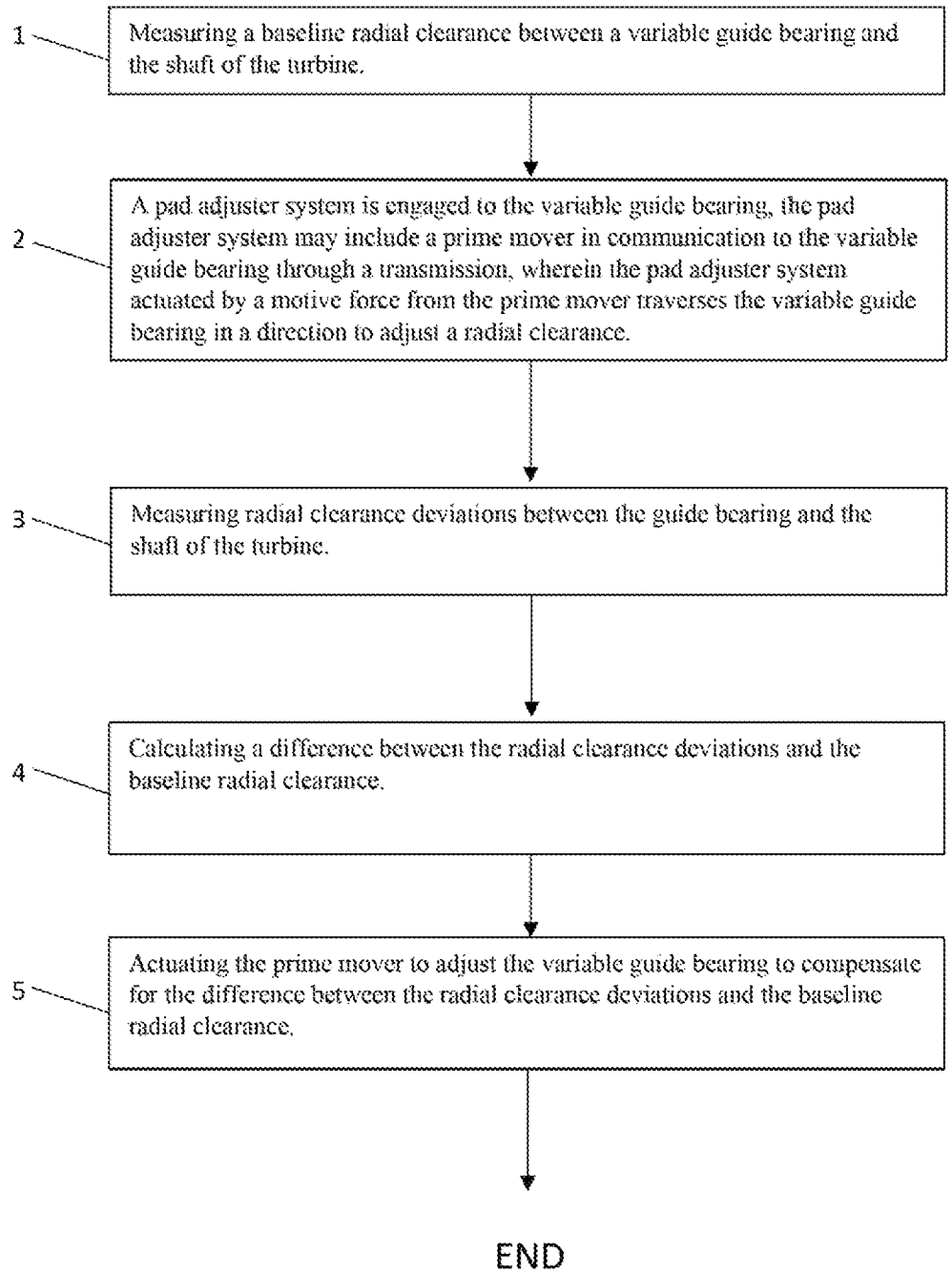
FIG. 1 is a flow diagram showing a method for adjusting the positioning of guide bearing pads to mitigate the effects of variations in the radial guide bearing clearance, in accordance with one embodiment of the present disclosure.

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Corresponding reference characters indicate corresponding parts throughout the several views. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure in any manner.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although specific terms are used in the following description for the sake of clarity, these terms are intended to refer only to the particular structure of the embodiment selected for illustration in the drawings, and are not intended to define or limit the scope of the disclosure.

The singular forms "a," "an," and "the" include plural referents unless the context clearly dictates otherwise. Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and are independently combinable (for example, the range "from 2 grams to 10 grams" is inclusive of the endpoints, 2 grams and 10 grams, and all intermediate values.

As used herein, approximating language may be applied to modify any quantitative representation that may vary without resulting in a change in the basic function to which it is related. Accordingly, a value modified by a term or terms, such as "about" and "substantially," may not be limited to the precise values specified. The modifier "about" should also be considered as disclosing the range defined by the absolute values of the two endpoints. For example the expression "from about 2 to about 4" also discloses the range "from 2 to 4."

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow of fluids through an upstream component prior to flowing through the downstream component.

The terms "horizontal" and "vertical" are used to indicate direction relative to an absolute reference, i.e. ground level. However, these terms should not be construed to require structure to be absolutely parallel or absolutely perpendicular to each other. For example, a first vertical structure and a second vertical structure are not necessarily parallel to each other. The terms "top" and "bottom" or "base" are used to refer to locations/surfaces where the top is always higher than the bottom/base relative to an absolute reference, i.e. the surface of the Earth. The terms "upwards" and "downwards" are also relative to an absolute reference; an upwards flow is always against the gravity of the Earth.

The term "directly" when used to refer to two system components, such as valves or pumps, or other control devices, or sensors (e.g. temperature or pressure), means that the first component and the second component are connected without any intermediary component, such as valves or pumps, or other control devices, or sensors (e.g. temperature or pressure), at the interface of the two components.

Hydroelectric turbine assemblies tend to have hydrodynamic guide bearings disposed adjacent to the shaft, below and/or above the generator. A guide bearing may comprise multiple discrete guide bearing pads (or "shoes") configured to reduce friction, facilitate rotational shaft movement during operation, resist lateral forces during fault events, and to center the shaft in the shaft housing. The guide bearing pads are typically disposed annularly within a shaft housing, in which the guide bearing pads define a radial guide bearing clearance between the guide bearing pads and the shaft. A shaft seal may be disposed below and above the guide bearing pads to contain hydrodynamic fluid (typically oil or water). The fluid fills spaces between the shaft, shaft housing, and shaft seals, including the radial guide bearing clearance. Ideally, the shaft spins against a film of fluid annularly disposed between the guide bearing pads and the rotating shaft. This fluid film is generally highly pressurized by the relative motion of the shaft to the pads in order to resist normal and fault forces and to keep the shaft centered.

However, it has been determined that the width of the radial guide bearing clearance can differ significantly depending on the bearing system's ambient temperatures. That is, a "cold" shaft creates a wider clearance than a "hot" shaft that has thermally expanded to operating temperatures. The radial guide bearing clearance is set once during system commissioning. Manual measurement and adjustment of radial guide bearing clearances can be tedious and time consuming, and must be done while the machine is off-line.

To compensate, the equipment suppliers evaluate shaft thermal expansion and size the shaft to expand into an acceptable "hot" radial guide bearing clearance when the turbine is running consistently at normal operating conditions. Therefore, suppliers typically install a cold shaft between the discrete guide bearing pads. This results in a "cold" radial guide bearing clearance that is generally wider and less concentric (due to suboptimal flow conditions in the fluid film) than a "hot" radial guide clearance. After startup, the shaft gradually warms and eventually expands until the shaft temperature equalizes to operating temperatures. The thermally expanded shaft thereby defines a narrower, more concentric "hot" radial guide bearing clearance.

During the startup period when there is a greater radial clearance, the fluid's film pressure is not sufficient to resist the side forces that the discharged dam water exerts on the turbine. The variable side forces thereby rock the turbine and rotor along the shaft, which frequently results in potentially system-compromising vibrations, wear-inducing or damage-inducing direct contact between the shaft and guide bearing pads, and unnecessary alarms or trips. A trip deactivates the turbine once vibrations surpass a programmed threshold, whereas alarms merely warn of an aberrant system condition. To bring the system to operating conditions, equipment owners often override the alarms and automatic shutoff protocols.

It has been determined that for this reason, starting up a turbine can be perilous. Nearby operating personnel subject themselves to safety risks, and the turbine-generator assembly risks being damaged. In an extreme case, a lose-fitting shaft may allow the rotor assembly to contact the stator assembly and essentially destroy the rotor poles, stator core, and stator winding. Vibration may also weaken or cause fatigue failure in other internal generator components. When operators or installers elevate alarm and trip thresholds to prevent trips at startup, the operators or installers may not detect significant problems in time to deactivate the system and avoid catastrophic failure.

Accordingly, there is a long-felt and unresolved need to mitigate the problems caused by radial clearance variances during startup. Furthermore, the radial guide clearance occasionally changes abruptly during operation in response to an upset condition. An upset condition may result from hydraulic disturbances, electrical fault, applying the turbine brakes suddenly, the turbine runner encountering a large piece of debris, or some other unplanned operational event.

In accordance, with the methods, structures and computer program products that are described herein, the problem of shaft vibrations in rotating machines having hydrodynamic bearings is mitigated by a system configured to monitor the radial clearance between guide bearings, and the shaft about which the guide bearings are positioned, and to adjust a position of one or more guide bearing pads relative to the shaft while the rotating machine is active. An advantage of the exemplary system may be that the radial guide bearing clearance may be continuously monitored and adjusted in response to a thermally expanding shaft, thereby maintaining an optimal radial guide bearing clearance during startup and throughout operation of the rotating machine.

A further advantage of some embodiments of the system described in the present disclosure may be the protection against back driving that may otherwise result from upset conditions of the radial guide bearing clearance. Back driving occurs when the shaft assembly unexpectedly contacts a guide bearing pad. The contact force may be sufficient to drive the guide bearing pad and any linear adjustment bolt back (i.e. radially outward) from the shaft's center of rotation. The back driving force would render the static adjustment mechanisms disclosed in these prior patent applications and utility models non-functional. A back-driven guide bearing pad creates a large, uneven gap between the pad's back-driven shaft side and the shaft, which can quickly destabilize the shaft assembly and require immediate system shutdown.

The methods and systems of the present disclosure are now described in greater detail with reference to FIGS. 1-9.

Figure 7:
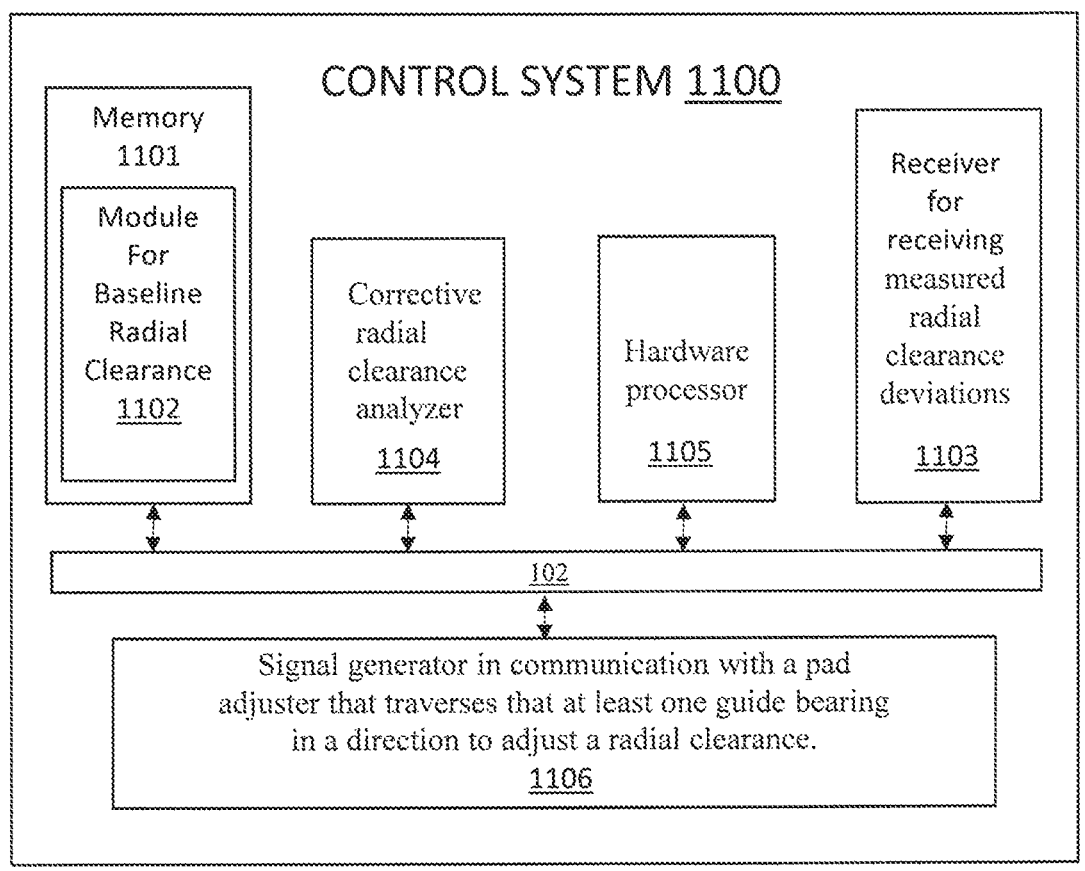
FIG. 7 is a block diagram depicting a first embodiment of a system for adjusting the positioning of guide bearing pads to mitigate the effects of variations in the radial guide bearing clearance, in accordance with the present disclosure.
Figure 8:
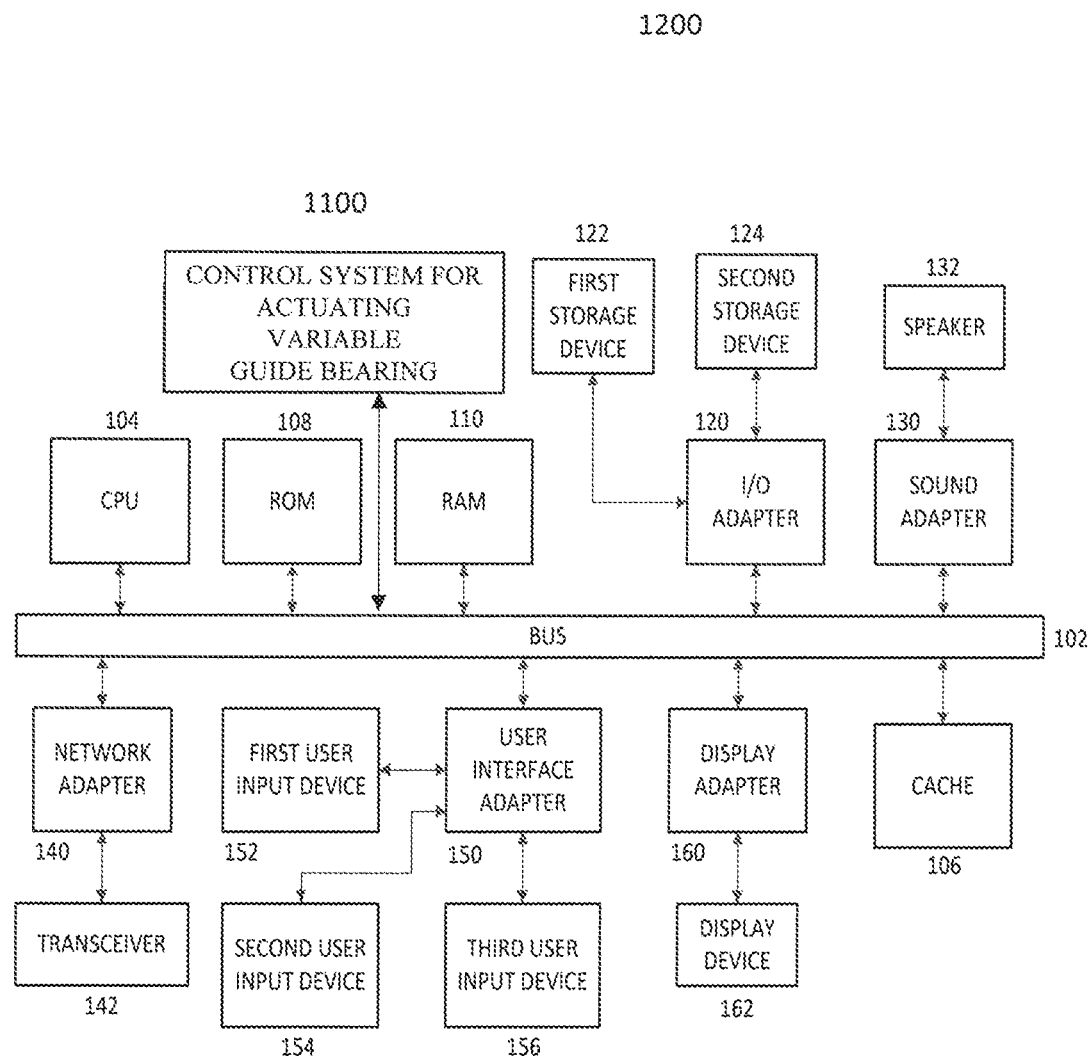
FIG. 8 is a block diagram illustrating a system that can incorporate the system for adjusting the positioning of guide bearing pads that is depicted in FIG. 7, in accordance with one embodiment of the present disclosure.

FIG. 1 is a flow diagram showing a method for adjusting the positioning of guide bearing pads 210, 410, 510, 610, 710 to mitigate the effects of variations in the radial guide bearing clearance, in accordance with one embodiment of the present disclosure. FIGS. 2-6 illustrate exemplary guide bearing adjustment systems 1000a, 1000b, 1000c, 1000d, 1000e that can be used in combination with the method described with reference to FIG. 1. FIGS. 7 and 8 illustrates some embodiments of a control system 1100 for use with the structures and methods depicted in FIGS. 1-6.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to block 1 of FIG. 1, in one embodiment, the method for maintaining a radial clearance between a variable guide bearing 293, 493, 593, 693, 793 and a shaft 220, 420, 520, 620, 720 of a turbine may begin with include measuring a baseline radial clearance between at least one guide bearing pad 210, 410, 510, 610, 710 and the shaft 220, 420, 520, 620, 720 of the turbine. The turbine may be a hydroelectric turbine. However, the methods, systems and structures of the present disclosure are not limited to only this example. The methods, structures and systems described herein are applicable to any turbine systems that employs guide bearings.

Figure 2:
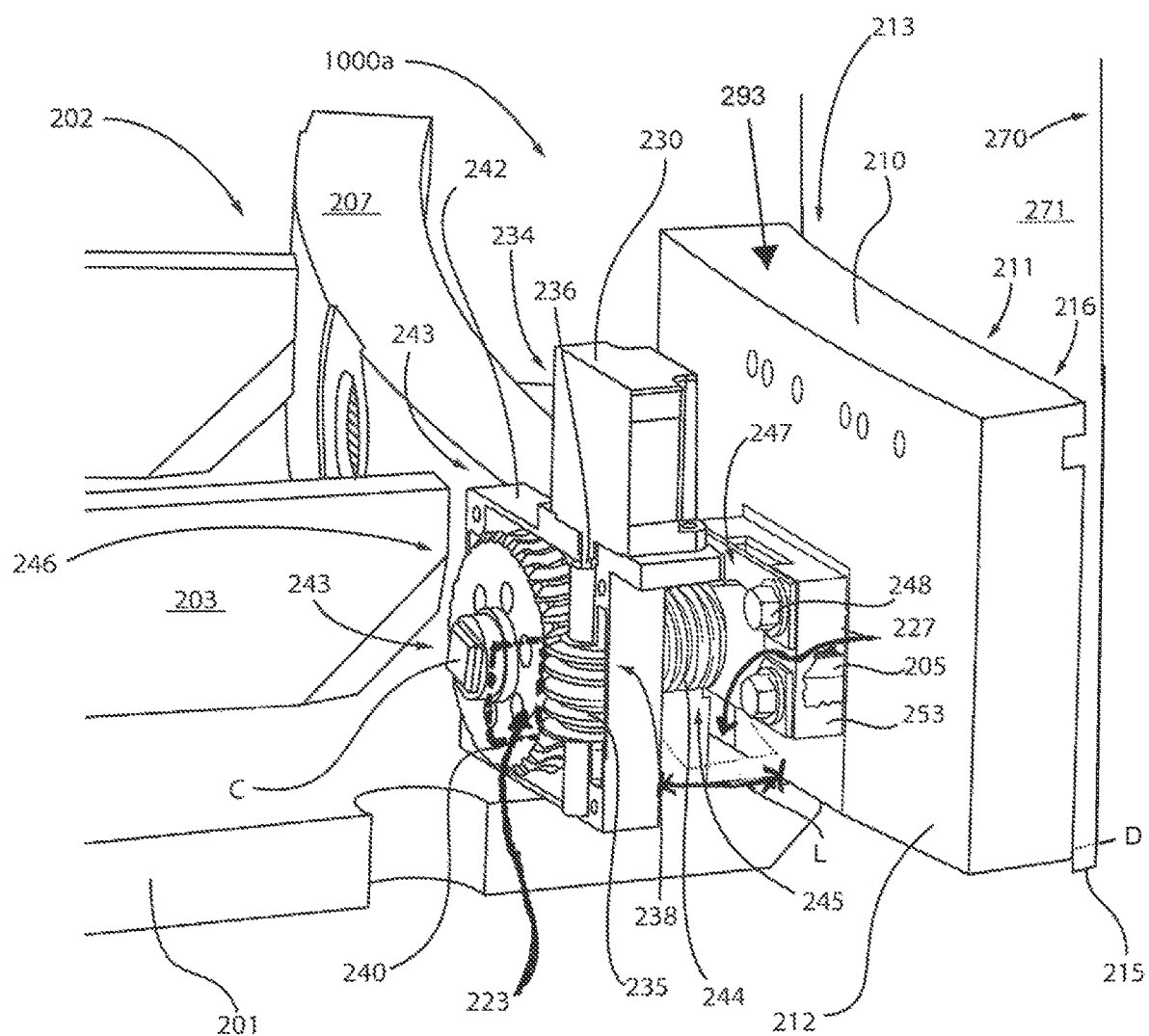
FIG. 2 is a perspective view of an exemplary guide bearing adjustment system with the gearbox cover removed for clarity depicting at least a shaft of a turbine, a guide bearing pad, and the radial clearance between the sidewall of the shaft and the guide bearing pad, in accordance with one embodiment of the present disclosure.

As used herein, the "radial clearance" is a dimension between an outermost shaft end 211 of the at least one bearing pad and an outermost perimeter of a shaft assembly (shaft 220). The radial clearance is depicted in FIG. 2 by reference number 215, in which the dimension for the radial clearance is identified by D. The radial clearance is identified by reference numbers 415, 515, 615, 715 in FIGS. 3A-6. The radial clearance in the systems described herein may be continually measured, and compared to the "baseline radial clearance". In some embodiments, the difference between the baseline radial clearance and the measured radial clearance provides the differential by which the variable guide bearing 293 may be adjusted to provide for an optimized clearance. The baseline radial clearance may take into account a mode of operation for the turbine. For example, the baseline clearance may be different for start up of the turbine, when the turbine is cold, when the turbine is hot and a combination of those factors. The baseline radial clearance may also take into account different operational considerations of the turbine, such as the hours that a turbine may have been in operation.

Referring to FIG. 7, the baseline radial clearance 1102 may be stored in the memory 1101 of a control system 1100 for maintaining a radial clearance between a variable guide bearing and a shaft of a turbine. The control system 1100 may also be referred to as the controller that receives a distance signal from a sensor measuring the radial clearance and signals a pad adjuster 245, 445, 645, 745 to traverse the at least one bearing, e.g., variable guide bearing 293, 493, 593, 693, 793 to compensate for the deviations in the radial clearance. In one embodiment, the control system 1110 may include at least one module of memory 1102 for storing baseline radial clearance values for a dimension between at least one guide bearing and the shaft of the turbine.

The baseline radial clearance values may be entered into the control system 1100 by an operator that interfaces with the control system 1110 over a user interface adapter 150, as depicted in FIG. 8. In this example, an operator of the turbine may enter values for the baseline radial clearance from at least one input device 152, 153, 156. The at least one input device 152, 154, 156 may be any computing device, such as a desktop computer, mobile computer, laptop computer, tablet, smart phone and/or computer specific to the turbine.

The input devices 152, 154, 156 may be in connection with the user interface adapter 150 via a wireless connection, or the input devices 152, 154, 156 may be hard wired into electrical communication with the user interface adapter 150.

The baseline radial clearance may be a value that is manually measured from the turbines during start up, or while the device is offline, and may also take into account measurements while the turbine is in operation.

In some other embodiments, the control system 1100 may employ machine learning to adjust the baseline radial clearance taking into account at least one of historical measurements for the radial clearance, real time measurements of the radial clearance and manufacturer suggested values for the radial clearance. Machine learning algorithms build a mathematical model based on sample data, known as "training data", in order to make predictions or decisions without being explicitly programmed to perform the task. In this case, the historical measurements may be employed with non-operation conditions to provide training data algorithms, which can in turn be employed to use real time data to update the baseline radial clearance.

Referring to FIG. 1, the method may continue at block 2 with engaging a pad adjuster system to the at least one guide bearing 293. The guide bearing pads 210 are preferably made of oil-resistant or water material in addition to being made of a material that has a low friction coefficient. In one embodiment, the at least one guide bearing 293 may include a bearing pad 210 of steel with tin white metal lining. The white metal lining can be a tin-based babbitt. Tin-based babbitt is a material that contains more than 80% of tin alloy. The material may also contain lesser parts of antimony, lead and copper.

Some embodiments of the pad adjuster systems are depicted in FIGS. 2-6. In each of the following described embodiments, the pad adjuster system may include a prime mover 230 in communication through a transmission to a pad adjuster 245, 445, 645 that is connected to at least one guide bearing pad 210, 410, 510, 610, 710 of the guide bearing 293, 493, 593, 693, 793. The pad adjuster 245, 445, 645, 745 can be actuated by a motive force from the prime mover 230, which traverses the at least one guide bearing pad 210, 410, 510, 610, 710 in a direction to adjust a radial clearance. For example, the prime mover 230 may be a motor, such as a bidirectional motor that allows for the motor to turn in either direction, i.e., two opposing directions, while controlling the speed. In one example, when the motor of the prime mover 230 is moving in a first direction, the pad adjuster system may move the at least one guide bearing pad 210, 410, 510, 610, 710 to increase the radial clearance; and when the motor of the prime mover 230 is moving in a second direction (that is opposite the first direction) the pad adjuster system may move the at least one guide bearing pad 210, 410, 510, 610, 710 to decrease the radial clearance.

FIG. 2 is a perspective view of an exemplary guide bearing adjustment system 1000a with the gearbox cover removed for clarity. The exemplary guide bearing adjustment system 1000a may be disposed on a bearing support structure 202 comprising multiple ribs 203 engaging a support ring 207. The support ring 207 is sometimes known as a "bracket." Traditionally, fasteners secured static guide bearing pads to the support ring 207.

In the embodiment depicted in FIG. 2, the pad adjuster 245, being an adjustment bolt, extends through the support ring 207 to engage the guide bearing pad 210. However, it is contemplated that a pad adjuster 245 need not necessarily pass through the support ring 207 in all embodiments. Both the ribs 203 and the support ring 207 may be disposed on a platform 201.

A prime mover 230 engages a gearing system 241 represented by gearbox 242 in a non-collinear fashion relative to the length L of the pad adjuster 245. More specifically, a motor of the prime mover 230 is connected to a driveshaft 236 having one or more driveshaft gears 238 disposed around the driveshaft 236. The driveshaft gears 238 engages the active gear 246 of the gearing system 241 that is represented by the gearbox having reference number 242. In this example, the transmission of the pad adjuster system includes at least one of the driveshaft 236, the driveshaft gears 238 and the active gear 246 (which may be a worm gear 240) of the gearing system 241.

In the depicted embodiment, the pad adjuster's length L corresponds to the real or potential linear movement of the pad adjuster 245. In some embodiments, by configuring the prime mover 230 to engage a gearing system 241 non-collinearly relative to the real or potential linear movement of the pad adjuster 245, the exemplary guide bearing adjustment system 200 protects against unexpected back driving that could otherwise damage a bearing adjustment system, result in a loss of shaft guidance, or close the gap between rotating and stationary components. Without being bound by theory, the non-collinear engagement may provide sufficient counter-force to overcome back driving forces.

A prime mover assembly 234 engages a gearing system 241 represented by gearbox 242 in a non-linear fashion relative to the length L of the pad adjuster 245. The prime mover assembly 234 may comprise a prime mover 230, a drive shaft 236 engaged to the prime mover 230, and one or more driveshaft gears 238 disposed around the driveshaft 236. In FIG. 2, the driveshaft gear 238 is a worm screw 235. The driveshaft gear 238 engages the active gear 246 along a second plane 223 disposed tangentially to the circumference of the driveshaft gear 238.

In the depicted embodiment, the length L of the pad adjuster 245 corresponds to the real or potential linear movement of the pad adjuster 245. The length L of the pad adjuster 245 further separates a first end 243 of the pad adjuster 245 from a pad end 247 of the pad adjuster 245. As depicted in FIG. 2, the first end 243 of the pad adjuster 245 is the end of the pad adjuster 245 that is furthest from the guide bearing pad 210, while the pad end 245 of the pad adjuster 245 is the closest end of the pad adjuster 245 to the back side 212 of the guide bearing pad 210.

The length L of the pad adjuster 245 further defines a first plane 227. The pad adjuster 245 has a thread that provides for rotation of the pad adjuster 245 around the length L (center of rotation C). The length L of the pad adjuster 245 extends along a horizontal direction in FIG. 2. The first plane 227 is a horizontal plane in FIG. 2. The second plane 223 is not collinear with the first plane 227. In FIG. 2, the second plane is a vertical plane than intersects the first plane 223 perpendicularly. It has been discovered that by configuring the prime mover assembly 234 to engage a gearing system 241 through a driveshaft gear 238 disposed on a second plane 227, wherein the second plane 227 is not collinear with the first plane 223, the exemplary guide bearing adjustment system 200 is thereby configured to protect against unexpected back driving that could otherwise damage a bearing adjustment system. For example, the pad adjuster 245 may be rotated about a horizontal axis parallel to the length of the pad adjuster 245, while the driveshaft 236 engaged to the prime mover 230 is rotated about a vertical axis, the driveshaft gears 238 engaging the active gear 246.

In one example of the depicted embodiment in FIG. 2, the prime mover 230 engages a worm screw 235 (which provides the driveshaft gears 238). The worm screw 235 tangentially engages a worm wheel 240 (which provides the active gear 246) in the gearbox 242. The worm wheel 240 is disposed around the pad adjuster 245. When the prime mover 230 is activated, the prime mover 230 rotates the worm screw 235. The worm screw 235 in turn rotates the worm wheel 240 around the worm wheel's center of rotation C. The worm wheel 240 in turn engages threads 244 on the pad adjuster 245 thereby transforming the worm wheel's circular movement into linear movement. The pad adjuster 245 may engage the back side 212 of the guide bearing pad 210 directly. However, in other exemplary embodiments, one or more elements may be disposed between the pad end 247 of the pad adjuster 245 and the back side 212 of the guide bearing pad 210. For example, in the depicted embodiment, a spacer 253 encloses the pad end 247 and fasteners 248 engage the spacer 253 to the backside 212 of the guide bearing pad 210. The spacer 253 may be a fastener interface plate or other device configured to engage the pad adjuster 245 to the guide bearing pad 210. In other embodiments, the spacer 253 may be integrated into the guide bearing pad 210.

In FIG. 2, the guide bearing pad 210 together with the spacer 253 and fasteners 248 comprise the bearing pad assembly 213. In other exemplary embodiments, the bearing pad assembly 213 may comprise a bearing pad 210 and a structure configured to engage the pad adjuster 245 to the guide bearing pad 210.

Furthermore, in the depicted embodiment, the pad adjuster 245 is an adjustment bolt, but it will be understood that other devices configured to adjust the position of a guide bearing pad 210 along a radial plane defined by the center of rotation C of the shaft 220 are considered to be within the scope of this disclosure. Likewise, it will be understood that the prime mover 230 may comprise a motor, a hydraulic actuator, an electric stepper, or another device configured to actuate a gearing system 241. Additionally, the gearing system's power transmission functionality can be provided instead by a combination of power transmission solutions, which includes, but is not limited to gears, racks, pinions, belts, pulleys, and chains. The protective anti-back-drive function can be substituted by a specialized coupling, such as the one disclosed in US. Pat. Pub. No. 2013/0206530, the entirety of which is incorporated herein by reference, or a locking mechanism that is engaged when the prime mover 230 is not moving, or a prime mover 230 being designed to provide continuous magnetic resistance to guide bearing forces.

FIGS. 3A-6 are alternative exemplary embodiments of systems for guide bearing adjustments 1000b, 1000c, 1000d, 1000e including pad adjuster systems. In at least one example of the embodiment depicted in FIG. 2, each guide bearing pad 210 includes its own pad adjuster system, which may include a pad adjuster 245 that is actuated by an individual prime mover assembly 230, in which an individual transmission connects the individual prime mover assembly 230 to the pad adjuster 245. In the embodiment depicted in FIG. 2, the transmission may include at least one of the driveshaft 236, the driveshaft gears 238 and the active gear 246 (which may be a worm gear 240) of the gearing system 241. In the embodiments depicted in FIGS. 3A-6, the prime mover assembly does not engage each pad adjuster 445, 645, 745 for each guide bearing pad 210 individually. In the embodiments depicted in FIGS. 3A-6, a transmission is provided that includes a linkage member 483, 583, 683, 783 that can connect a single prime move assembly to more than one pad adjuster 445, 645, 745. In these examples, the linkage member 483, 583, 683 can allow for fewer prime mover assemblies to actuate a plurality of variable guide bearing pads 210, 410, 510, 610, 710. In certain exemplary embodiments, one prime mover assembly may be configured to move all guide bearing pads 210 through a linkage member 483, 583, 683, 783; and a gear system 441, 474, 541, 641, 649, 741 that transmits the mechanical force from the linkage member 483, 583, 683, 783 to the pad adjuster 445, 645, 745.

Figure 3A:
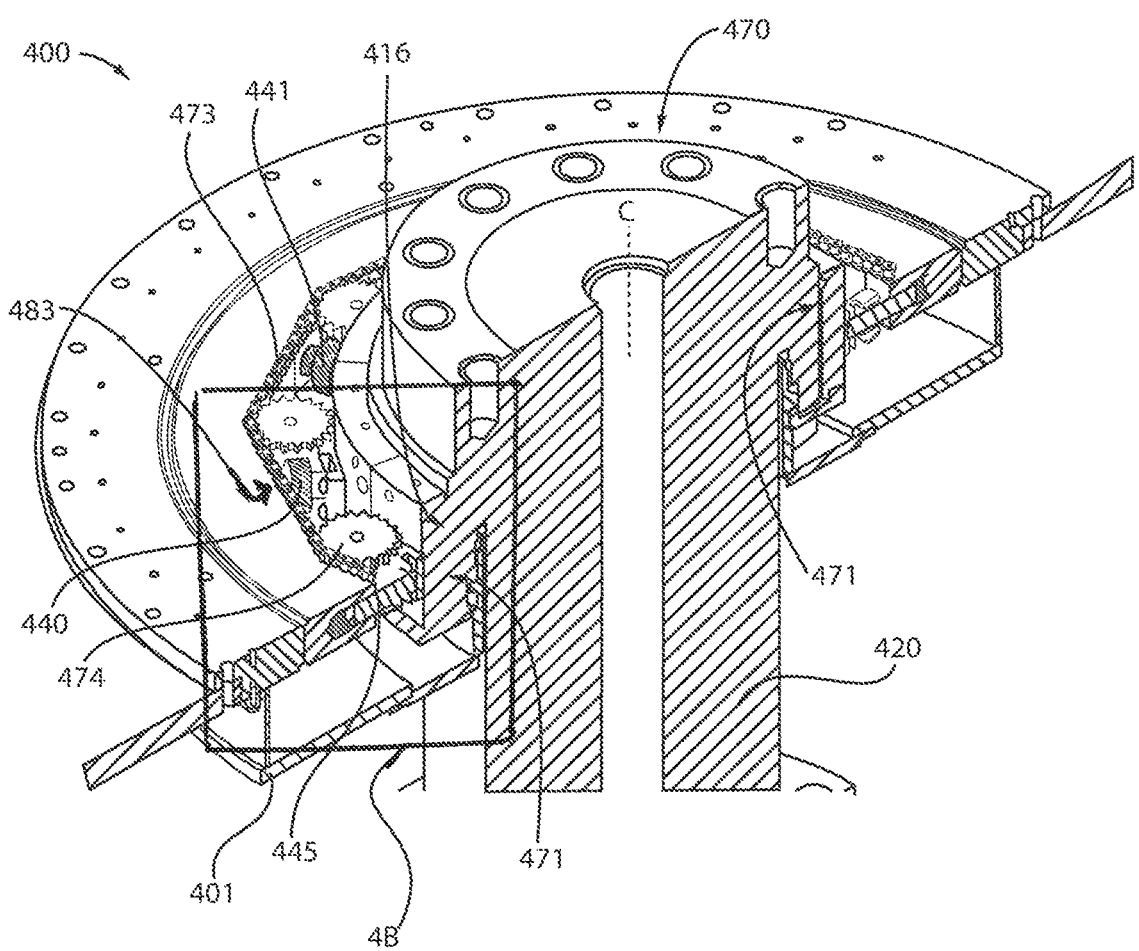
FIGS. 3A-3B are perspective views of some embodiments of a guide bearing adjustment system including a chain and sprocket as the transmission between a prime mover and the adjustable guide bearings.
Figure 3B:
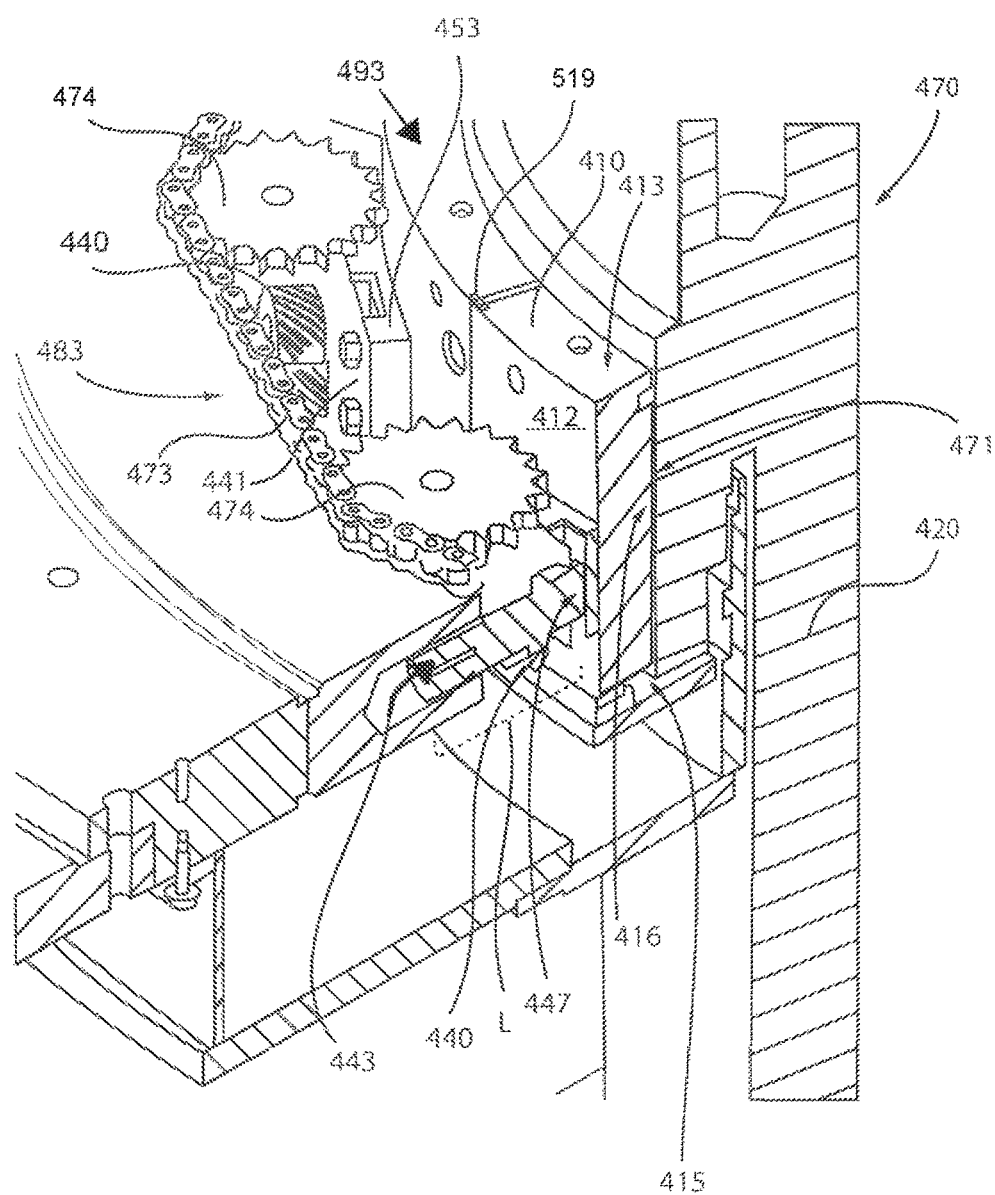

FIGS. 3A and 3B depict a chain-driven embodiment of a system for guide bearing adjustments 1000b in which the linkage member 483 comprises a chain 473 configured to transfer a motive force from the prime mover to a gearing system 441. The chain 473 mechanically engages the prime mover. The chain 473 also mechanically engages multiple sprocket gears 474, in which the chain 473 and the multiple sprocket gears 473 provides the gearing system 441. The bearing pad adjustment system 1000b can adjust the variable guide bearing pads 410 to adjust the radial clearance. The combination of the gearing system 441 and the chain 473 that provides the linkage member 483 provides the transmission that connects the prime mover and the pad adjuster 445 for moving the guide bearing pad 410 for adjusting the radial clearance. It is noted that the guide bearing pad identified by reference number 410 in FIG. 3A is similar to the guide bearing pad identified by reference number 210 in FIG. 2. Therefore, the description of the bearing pad identified by reference number 210 is suitable for describing the bearing pad identified by reference number 410. The radial clearance is between the outer perimeter 471 of the shaft 420, and the outermost surface 416 of the bearing pad 410.

In the depicted exemplary embodiment, the gearing system 441 includes a sprocket gear 474 having teeth for engaging the chain 473, as well as the threads on a worm wheel 440 engaged to the pad adjuster 445. Each sprocket gear 474 engages a worm wheel 440. The sprocket gear 474 transfers the motive force to the worm wheel 440. The worm wheel 440 engages threads 444 on the pad adjuster 445 to transform the rotational movement of the worm wheel 440 into linear movement for the pad adjuster 445. The pad adjuster 445 comprises a first end 443 distally disposed from a pad end 447. The pad end 447 engages the guide bearing pad 410. As depicted in FIGS. 3A and 3B, the first end 443 of the pad adjuster 445 is the end of the pad adjuster 445 that is furthest from the guide bearing d 410, while the pad end 445 of the pad adjuster 445 is the closest end of the pad adjuster 445 to the back side 412 of the guide bearing pad 410.

Figure 4:
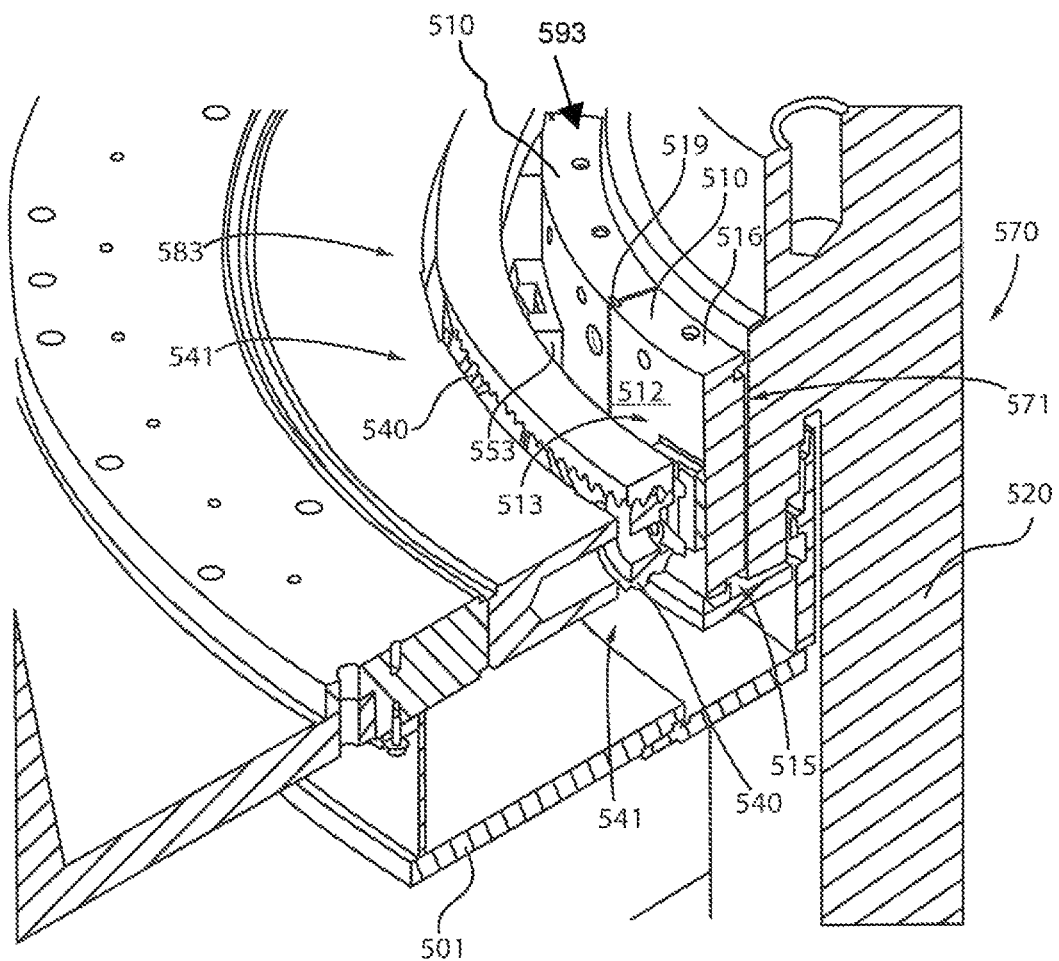
FIG. 4 is perspective view of an exemplary guide bearing adjustment system including a circular rack and pinion as the transmission between a prime mover and the adjustable guide bearings.

FIG. 4 depicts an exemplary bearing pad adjustment system 1000c in which the linkage member 583 includes a circular rack 567 that is in threaded engagement to pinion gears 540. The bearing pad adjustment system 1000c can adjust the variable guide bearing pads 510 to adjust the radial clearance. The circular rack 567 and the pinion gears 540 can provide the transmission that transmits the motive force from the prime mover to the pad adjuster, in which the pad adjuster applies the motive force to the back surface 512 of the guide bearing pads 510. The pinion gears 540 may be in threaded engagement with a pad adjuster (not depicted). It is noted that the guide bearing pad identified by reference number 510 in FIG. 4 is similar to the guide bearing pad identified by reference number 210 in FIG. 2. Therefore, the description of the bearing pad identified by reference number 210 is suitable for describing the bearing pad identified by reference number 510. The radial clearance is between the outer perimeter 571 of the shaft 520, and the outermost surface 516 of the bearing pad 510.

A prime mover, e.g., motor, engages the circular rack 567. The circular rack 567 in turn engages multiple pinion gears 540 annularly arrayed around the shaft assembly 570, wherein each pinion gear 540 engages a bearing adjuster configured to engage a guide bearing pad assembly 513. The shaft assembly 570 may be the shaft of a hydroelectric turbine. The guide bearing pad assembly 513 is similar to the guide bearing pad assembly 213 that is depicted in FIG. 2. The guide bearing pad assembly 513 may include a spacer 553 and fasteners to the guide bearing pad 510.

In some embodiments, the prime mover rotates the circular rack 567, and the circular rack 567 transfers the motive force to the pinion gear 540 and subsequently, the bearing adjuster (pad adjuster). The bearing adjuster engages the guide bearing assembly 513, and thereby adjusts the position of the guide bearing pads 510 uniformly along radial lines extending from the shaft's center of rotation C. A seal 519 may be disposed adjacent guide bearing pads to prevent lubricant, such as water or oil from leaking out from the gap 515.

Figure 5:
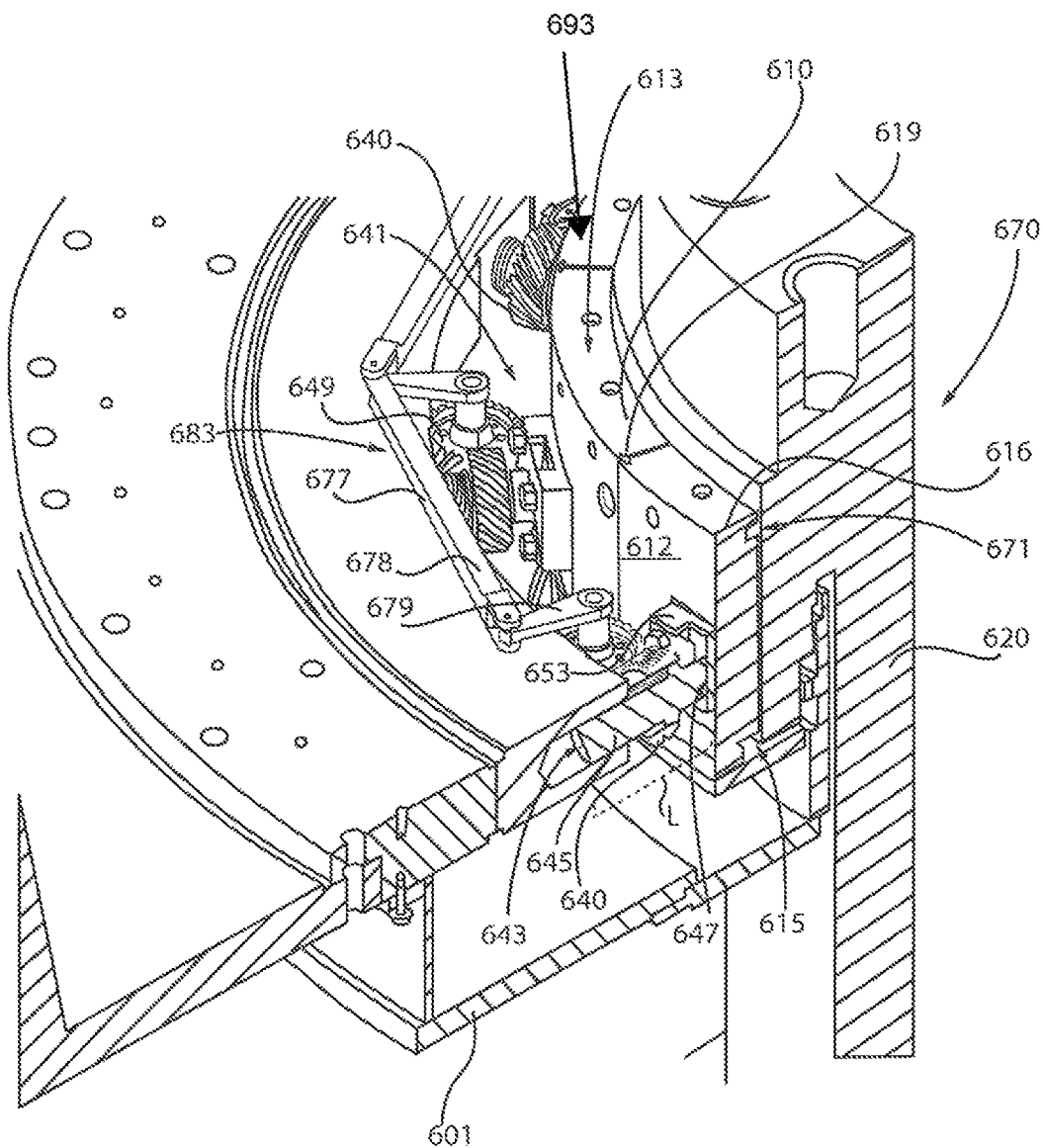
FIG. 5 is a perspective view of an exemplary guide bearing adjustment system including lever action and gears as the transmission between a prime mover and the adjustable guide bearings.

FIG. 5 depicts an exemplary bearing adjustment system 1000*d* in which the linkage member 683 includes a lever action 678. The bearing pad adjustment system 1000*d* can adjust the variable guide bearing pads 610 to adjust the radial clearance. The lever action 678 may include an arm 679 that is in contact with a gearing system 641 that includes a worm wheel 649 and a pinion gear 640 that corresponds to each of the variable guide bearing pads 610. The arm 679 of the level action 678 is in direct communication with the worm wheel 649. The worm wheel 649 may be in threaded engagement with the pinion gear 640. The pinion gear 640 is engaged to the pad adjuster 645. The bearing pad adjustment system 1000*d* can adjust the variable guide bearing pads 610 to adjust the radial clearance. The lever action 678 may further include lever links 677. The lever links 677 connect each of the arms 679. The lever links 677 and the arms 679 of the lever action 678, in connection with the worm wheel 649 and the pinion gear 640, can provide the transmission that transmits the motive for generated by the prime mover to the pad adjuster 645, in which the pad adjuster 645 is connected to the variable guide bearing pads 610. The pinion gears 640 may be in threaded engagement with a pad adjuster (not depicted). It is noted that the guide bearing pad identified by reference number 610 in FIG. 5 is similar to the guide bearing pad identified by reference number 210 in FIG. 2. Therefore, the description of the bearing pad identified by reference number 210 is suitable for describing the bearing pad identified by reference number 610. The radial clearance is between the outer perimeter 671 of the shaft 620, and the outermost surface 616 of the bearing pad 610.

A prime mover, e.g., motor, engages the lever action 678. The lever action 678 in turn engages multiple pinion gears 640 annularly arrayed around the shaft assembly 670, wherein each pinion gear 640 engages a bearing adjuster configured to engage a guide bearing pad assembly 613. The shaft assembly 670 may be the shaft of a hydroelectric turbine. The guide bearing pad assembly 613 is similar to the guide bearing pad assembly 213 that is depicted in FIG. 2. The guide bearing pad assembly 613 may include a spacer 653 and fasteners to the guide bearing pad 610.

In some embodiments, the prime mover rotates the lever action 678, and the lever action 678 transfers the motive force to the pinion gear 640 and subsequently, the bearing adjuster (pad adjuster 645). The bearing adjuster 645, engaging the guide bearing assembly 613, thereby adjusts the position of the guide bearing pads 610 uniformly along radial lines extending from the shaft's center of rotation C. A seal 619 may be disposed adjacent guide bearing pads to prevent lubricant, such as water or oil from leaking out from the gap 615.

In some embodiments, a prime mover engages the lever action 678. In other exemplary embodiments, the lever action 678 can be configured to disengage the worm wheel 649 when adjustment is not desired.

Figure 6:
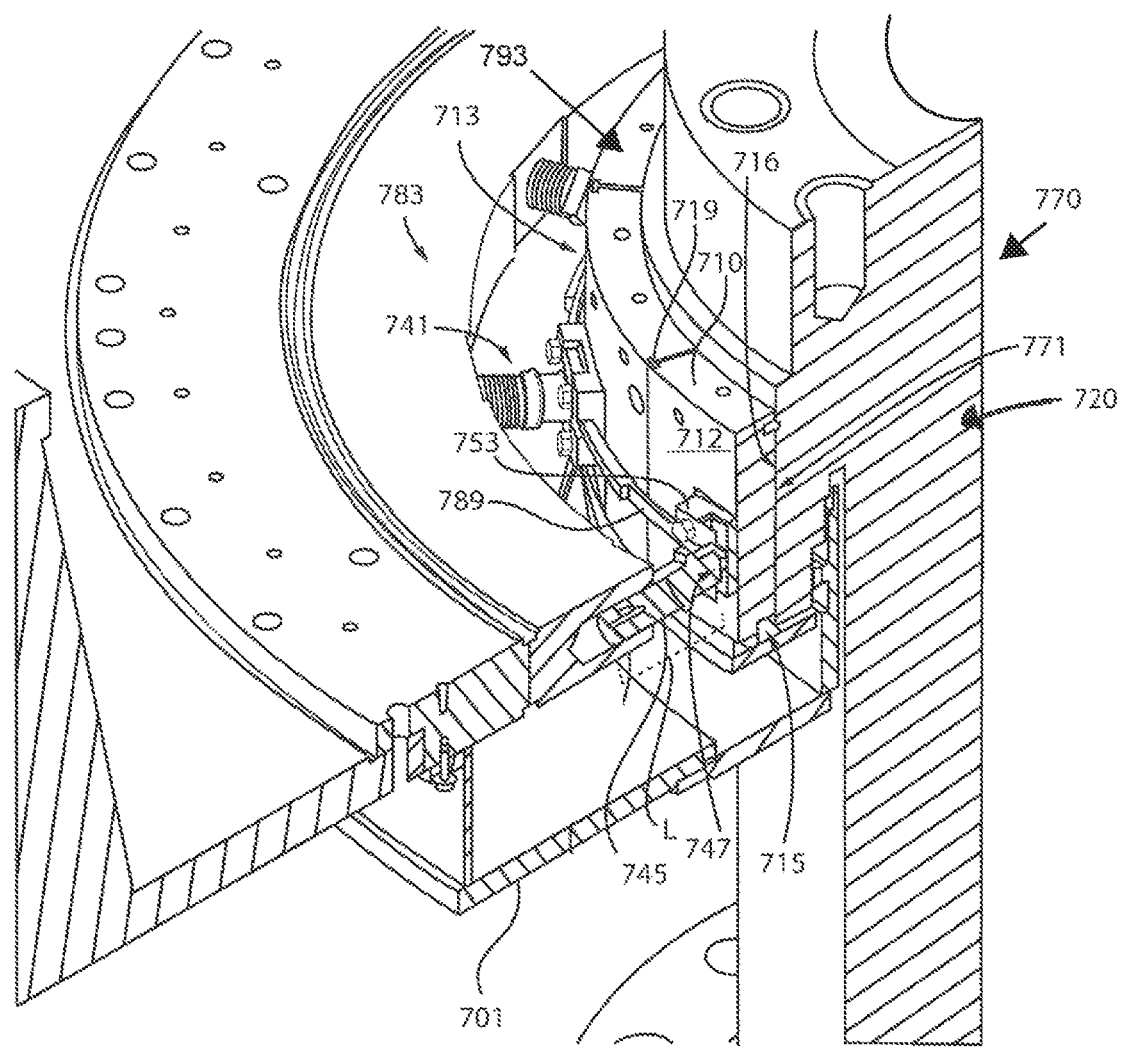
FIG. 6 is a perspective cross-sectional view of an exemplary guide bearing adjustment system comprising a wedge system as the transmission between a prime mover and the adjustable guide bearings.

FIG. 6 depicts another exemplary bearing adjustment system 1000*e* in which the linkage member 783 includes a wedge system 789 that relies on friction around the entire circumference of the back side 712 of the guide bearing pads 710 to resist back-driving at any one or several guide bearing pads 710. In the embodiment that is depicted in FIG. 6, the transmission of the pad adjuster system is the wedge system 789. The bearing pad adjustment system 1000*e* can adjust the variable guide bearing pads 710 to adjust the radial clearance. It is noted that the guide bearing pad identified by reference number 710 in FIG. 6 is similar to the guide bearing pad identified by reference number 210 in FIG. 2. Therefore, the description of the bearing pad identified by reference number 210 is suitable for describing the bearing pad identified by reference number 710. The guide bearing pad 710 is a component of a guide bearing pad assembly 713. The guide bearing pad assembly 713 is similar to the guide bearing pad assembly 213 that is depicted in FIG. 2. The guide bearing pad assembly 713 may include a spacer 753 and fasteners to the guide bearing pad 610. The radial clearance is between the outer perimeter 771 of the shaft 720, and the outermost surface 716 of the guide bearing pad 710.

A prime mover, e.g., motor, engages the lever action 778. The lever action 778 in turn engages the back surface 712 of the guide bearing pads 710 annularly arrayed around the shaft assembly 770. More specifically, a tapered portion of the wedge system 789 is inserted between the spacer 753 that is connected to the back surface 712 of the guide bearing pads 710 and the pad end 247 of the pad adjuster 245. The greater dimension of the tapered portion of the wedge system 789 being slid between the pad end 747 of the pad adjuster 745 and the spacer 753 that is connected to the back surface 712 of the guide bearing pads 710 the greater distance that the guide bearing pads 710 are moved towards the outside perimeter 716 of the shaft 720. The prime mover rotates the lever action 778, and the lever action 778 transfers the motive force to the guide bearing pads 710. It is noted wedge system 789 may actuate multiple guide bearing pads 710 simultaneously. The wedge system 789 that is positioned between the bearing adjuster 745 and the spacer 753 connected to the back surface 712 of the guide bearing pads 710 of the guide bearing assembly 613, thereby adjusts the position of the guide bearing pads 710 uniformly along radial lines extending from the shaft's center of rotation C.

A seal 719 may be disposed adjacent guide bearing pads to prevent lubricant, such as water or oil from leaking out from the gap 715.

Referring back to FIG. 1, the method may further include measuring radial clearance deviations between the at least one guide bearing pad 210, 410, 510, 610, 710 and the shaft 220, 420, 520, 620, 720 of the turbine at block 3. The radial clearance deviations may be measured at any time with respect to the operation and non-operation of the turbine. For example, cold measurements may be made when the turbine is not in operation, and hot measurements may be made when the turbine is functioning.

In some embodiments, a proximity sensor may take measurements of the radial clearance. Those measurements may be employed to determine a deviation from, i.e., difference from, the radial clearance from the baseline radial clearance that is set at block 1 of the method illustrated by FIG. 1. The term, "proximity sensor" can be used to refer to different technologies having slightly different names, but all being sensors that result in a signal (digital, analog or mechanical) that is meant to indicate a distance, or proximity. One embodiment of a proximity sensor that is suitable for the methods, structures and systems of the present disclosure is identified by reference number 205 in FIG. 2. In some embodiments, on the guide bearing pad side 216, a sensor end of the proximity sensor 205 is disposed within the guide bearing adjustment system, as depicted in FIG. 2. Any such substitutions are considered to be within the scope of this disclosure. In other exemplary embodiments, the proximity sensor may be omitted in favor of precise position feedback signals generated directly from the prime mover 230.

By way of example, the proximity sensor 205 may be disposed within the guide bearing pad 210 and may have a sensor end facing the shaft assembly 270. However, in other exemplary embodiments, the proximity sensor 205 may be disposed on the guide bearing pad 210 or above, below, or adjacent to the guide bearing pad 210. The proximity sensor 205 is configured to measure the distance D of the radial clearance 215 between the outermost surface 216 of the bearing pad assembly 213 and the outermost perimeter 271 of the shaft assembly 270. The radial clearance 215 is typically the space between the guide bearing pad's shaft side 211 and the shaft 220. This radial clearance 215 is configured to be filled with lubricant 217, such as water or oil. That is, in FIG. 2, the outermost surface 216 of the bearing pad assembly 213 is the shaft side 211 of the guide bearing 210 and the outermost perimeter 271 of the shaft assembly 270 is the perimeter of the shaft 220.

Accordingly, the radial clearance 215 is the distance D between the shaft side 211 and the shaft 220. However, in other exemplary embodiments, the shaft assembly 270 may further comprise one or more sleeves disposed around the shaft 220. When a sleeve or other object is disposed between the shaft side 211 of the guide bearing pad 210 and the shaft 220, the radial clearance will be understood to be the distance D between the outermost surface 216 of the bearing pad assembly 213 and the outermost perimeter 271 of the shaft assembly 270.

It is noted that the description of the proximity sensor identified by reference number 205 for the bearing adjustment system 1000a that is in FIG. 2 is equally applicable for providing the description of the proximity sensor that can be employed for the bearing adjustment systems 1000b, 1000c, 1000d, 1000 that are depicted in FIGS. 3A-6. In each of the embodiments that are depicted in FIGS. 3A-6, a proximity sensor may be integrated into the guide bearing pad assembly 413, 513, 613, 713 similar to how the proximity sensor is integrated into the guide bearing pad assembly 213 that is depicted in FIG. 2. More specifically, a proximity sensor may be disposed on the guide bearing pad 410, 510, 610, 710 or above, below, or adjacent to the guide bearing pad 410, 510, 610, 710. The proximity sensor is configured to measure the distance of the radial clearance 415, 515, 616, 715 between the outermost surface 416, 516, 616, 716 of the bearing pad assembly 413, 513, 613, 713 and the outermost perimeter 471, 571, 671, 771 of the shaft assembly 470, 570, 670, 770.

In some embodiments, the proximity sensor 205 is an inductive eddy current sensor. Inductive "eddy current" sensors are designed to output an analog voltage that is proportional to the distance between the sensor face and an electrically conductive 'target', e.g., the outermost perimeter 271 of the shaft assembly 270. In operation the driver excites a wire wound coil in the probe with an RF signal. In one example, the RF signal is approximately 1 MHz. The coil in the probe generates an oscillating electromagnetic field. Any electrically conductive material engaging the field will have "eddy current" induced in its surface. The eddy current produces its own electromagnetic field. The interaction between the coil field and eddy current field produces an impedance change in the coil, the magnitude which is based on the distance between the two fields, or between the probe and the target surface. The driver monitors the impedance of the coil and outputs a linear analog voltage proportional to the distance between the probe and the target surface.

Referring to FIG. 1, the method may continue with block 4 that further calculating a difference between the radial clearance deviations and the baseline radial clearance. In some embodiments, the calculation of the difference between the radial clearance deviations and the baseline radial clearance is provided by a control system 1100, which can include a corrective radial clearance analyzer 1104. FIGS. 7 and 8 depict one embodiment of a control system 1100 for adjusting the positioning of guide bearing pads 210, 410, 510, 610, 710 to mitigate the effects of variations in the radial guide bearing clearance. The control system 1100 may also be referred to as a controller.

The control system 1100 is in communication with the pad adjuster systems that have been described above with reference to FIGS. 2-6. For example, the control systems 1110 may be in communication either by wireless communication or by hard wired communication with the prime mover, such as the prime mover identified by reference number 230 in FIG. 2. For example, the control system 1100 may include at least one signal generator 1106 in communication with the pad adjuster system that traverses the at least one guide bearing pad 210, 410, 510, 610, 710 in a direction to adjust the radial clearance. In one embodiment, the at least one signal generator 1106 is in communication with the prime mover 230.

In some embodiments, the control system 1100 may include a receiver 1103 for receiving measured radial clearance deviations between at least one guide bearing pad 210, 410, 510, 610, 710 and the shaft 270, of the turbine.

In some embodiments, the control system 1100 may further include a corrective radial clearance analyzer 1104 that employs a hardware processor 1105 for performing a set of instructions for comparing the measured radial clearance deviations to the baseline radial clearance values in providing a corrective radial clearance dimension. As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

More specifically, the control system 1110 receives data measured on the radial clearance from the proximity sensor 205, which can measured the radial clearance when the turbine is hot or cold, and/or when the turbine is offline or running, etc. The control system 1110 then employs the corrective radial clearance analyzer 1104 to compare the data measured on the radial clearance from the proximity sensor 205 to the baseline radial clearance that was previously determined in step 1 of the method depicted in FIG. 1. The baseline radial clearance values may be stored in the memory 1101 of the control system 1100, which can be provided in a module for baseline radial clearance 1102. In some embodiments, the corrective radial clearance analyzer 1104 determines if the difference between the baseline radial clearance and the measured radial clearance is a deviation that is significant enough to be a radial clearance deviation from which the system of variable guide bearing may benefit from a correction in the radial clearance actuated by the pad adjuster system. To determine if correction is suitable, the corrective radial analyzer may employ a number of rules that are actuated by the hardware processor 1105 in calculating a solution to radial clearance deviations.

Each of the components for the control system 1110 that are depicted in FIG. 7 may be interconnected via a system bus 102.

Any of the systems or machines (e.g., devices) shown in FIG. 7 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed above with respect to FIGS. 1-6, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

The control system 1100 may be integrated into the processing system 1200 depicted in FIG. 8. The processing system 1200 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 1200 depicted in FIG. 8, may further include a first storage device 122 and a second storage device 124 are operatively coupled to system bus 102 by the/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from the processing system 1200.

Of course, the processing system 1200 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1200 are readily contemplated by one of ordinary skill in the art given the teachings of the present invention provided herein.

Referring to block 5 of FIG. 1, in some embodiments, the method includes actuating the prime mover to adjust the at least one guide bearing to compensate for the difference between the radial clearance deviations and the baseline radial clearance.

Figure 9:
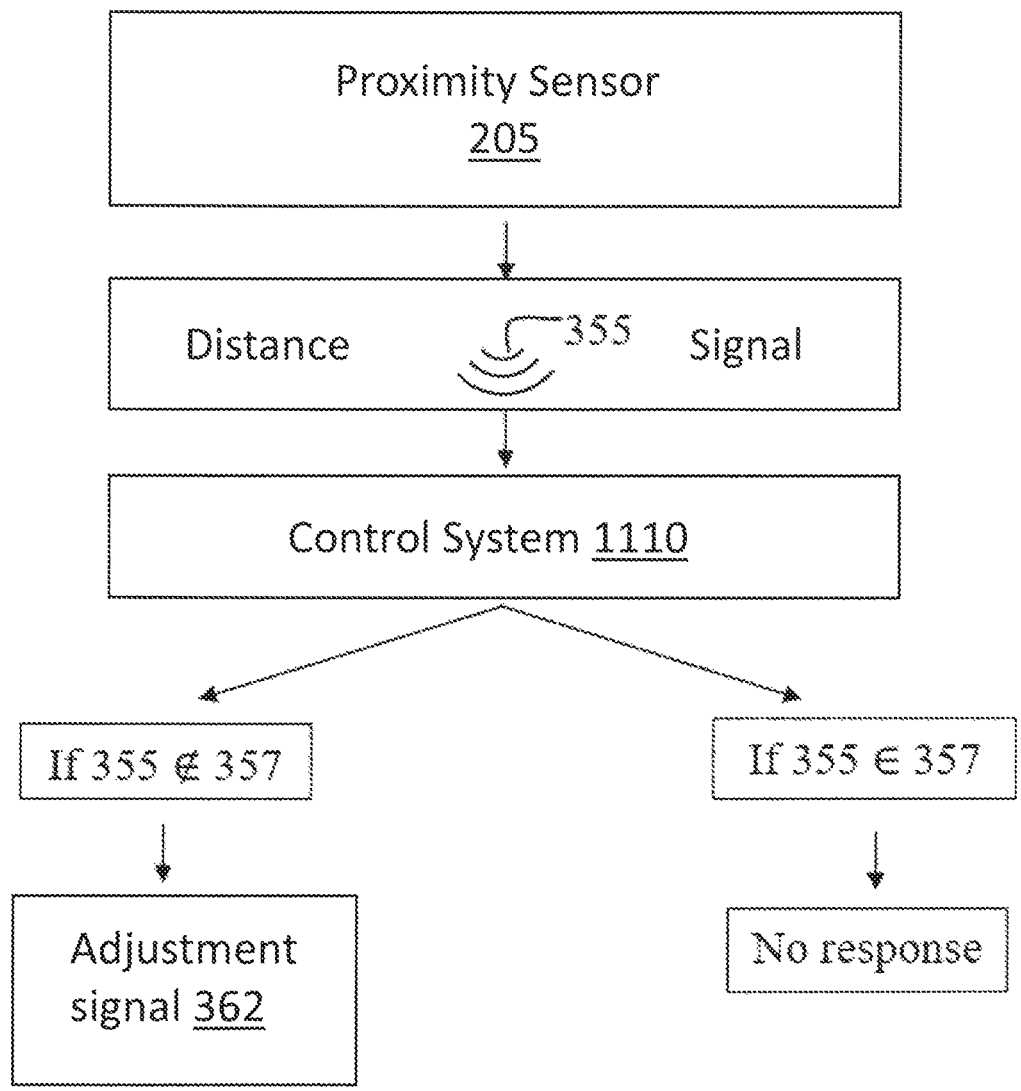
FIG. 9 is a flowchart depicting possible signal paths of the distance signal.

FIG. 9 is a flowchart depicting possible signal paths of the distance signal 355, which is measured by the proximity sensor 205 in measuring the radial clearance. In operation, the proximity sensor 205 measures the distance D of the radial clearance 215, 415, 515, 615, 715 to generate a distance signal 355. The proximity sensor 305 then transmits the distance signal 355 to the control system 1100 that is configured to analyze the distance signal 355. The control system 1100 may take a variety of forms physically, and may include by way of example, an integrated power and signal device, or separate power and signal processing devices connected together. The control system 1100 may be digital or analog, and controlled by programmable logic controller ("PLC") logic or relay logic. In an exemplary embodiment, the control system 1100 includes a corrective radial clearance analyzer 1104 that compares the value of the distance signal 355 to a programed range 357. The programed range 357 may include the values stored within the module for baseline radial clearance that can be stored in the memory 43 of the control system 1100. The control system 1100 can then send an adjustment signal 362 to the prime mover 230 if the distance signal 355 differs (e.g. is not an element in) from the programed range 357. In one embodiment, if the distance signal 355 exceeds the programed range 357, the adjustment signal 362 directs the guide bearing pad 210, 410, 510, 610, 710 toward the shaft 220, 420, 520, 620, 720. In one embodiment, if the distance signal 355 does not exceed the programed range 357, the adjustment signal 362 withdraws the guide bearing pad 210, 410, 510, 610, 710 from the shaft 220, 420, 520, 620, 720. In certain exemplary embodiments, the pad adjuster 245, 445, 645, 745 is configured to move the guide bearing pad 210, 410, 510, 610, 710 along a radial plane defined by the center of rotation C of the shaft 220, 420, 520, 620, 720 in response to the adjustment signal 362. In other exemplary embodiments, the pad adjuster 245, 445, 645, 745 may adjust the pitch of the guide bearing pad 220, 420, 520, 620, 720 in response to the adjustment signal 362. Components of the exemplary guide bearing adjustment system are desirably made of oil-resistant materials.

In an exemplary embodiment, the prime mover 230 provides a redundant position signal to the control system 1100 to confirm the position of the radial guide bearing pad 210, 410, 510, 610, 710.

The present invention may be a system, a method, and/or a computer program product at any possible technical detail level of integration. The computer program product can provide a method for maintaining a radial clearance between a variable guide bearing and a shaft of a turbine. The computer program product may include a computer readable storage medium (or media) having computer readable program instructions thereon for causing a processor to carry out aspects of the present invention. For example, the present disclosure provides a computer program product comprising a non-transitory computer readable storage medium having computer readable program code embodied therein. The computer readable program code can provide the steps of measuring a baseline radial clearance between at least one guide bearing and the shaft of the turbine. A pad adjuster may be engaged to the at least one guide bearing. The pad adjuster may include a prime mover in communication to the at least one guide bearing through a transmission, wherein the pad adjuster actuated by a motive force from the prime mover traverses that at least one guide bearing in a direction to adjust a radial clearance. The method may further include measuring radial clearance deviations between the at least one guide bearing and the shaft of the turbine, and calculating a difference between the radial clearance deviations and the baseline radial clearance. In some embodiments, the method includes actuating the prime mover to adjust the at least one guide bearing to compensate for the difference between the radial clearance deviations and the baseline radial clearance.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Having described preferred embodiments of a variable guide bearing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for maintaining a radial clearance between a variable guide bearing and a shaft of a turbine comprising:
    measuring, a baseline radial clearance between the variable guide bearing and the shaft of the turbine;
    engaging a pad adjuster system to the variable guide bearing, the pad adjuster system includes a prime mover in communication to the variable guide bearing through a transmission, wherein the pad adjuster system is actuated by a motive force from the prime mover traversing the variable guide bearing in a direction to adjust the radial clearance, and wherein the pad adjuster system includes a threaded pad adjuster in contact with a back surface of the variable guide bearing, and an active gear in communication with the threaded pad adjuster in a non-collinear fashion relative to a length of the pad adjuster;
    measuring radial clearance deviations between the variable guide bearing and the shaft of the turbine;
    calculating a difference between the radial clearance deviations and the baseline radial clearance; and
    actuating the prime mover to adjust the variable guide bearing to compensate for the difference between the radial clearance deviations and the baseline radial, clearance.

2. The method of claim 1, wherein the method is a computer implemented method.

3. The method of, claim 1, wherein the active gear is a worm gear.

4. The method of claim 3, wherein the worm gear is in threaded engagement to a driveshaft gear actuated by the prime mover through a drive shaft.

5. The method of claim 1, wherein the active gear is driven by a chain actuated by the prime mover, the chain, connecting a plurality of pad adjusters to a plurality of guide bearings.

6. The method of claim 1, wherein the active gear is driven by an arm connected to a linkage actuated by the prime mover, the linkage connecting a plurality of pad adjusters to a plurality of variable guide bearings.

7. The method of claim 1, wherein the prime mover is configured to provide a redundant position signal to a control system actuating the prime mover to confirm a position of the variable guide bearing.

8. A non-transitory article of manufacture tangibly embodying a computer readable program which when executed causes a computer to perform the method of claim 1.

9. A guide bearing system comprising:
    a pad adjuster system including a pad adjuster and a prime mover assembly configured to produce a motive force to traverse a bearing in a direction to adjust a radial clearance, wherein the radial clearance is a dimension between an outermost shaft end of a bearing pad and an outermost perimeter of a shaft assembly, the pad adjuster system further comprising a gearing system, the pad adjuster engaging the gearing system, wherein the pad adjuster has a first end and a pad end distally separated from the first end by a length, wherein the length defines a first plane, and wherein the pad end engages a bearing pad assembly including the bearing, the bearing pad assembly comprising the bearing pad having an outermost shaft end, the prime mover assembly engaging the gearing system on a second plane, wherein the second plane is not coextensive with the first plane;
    a sensor for measuring deviations in the radial clearance; and
    a control system configured to receive a distance signal from the sensor measuring the radial clearance and configured to signal the pad adjuster to traverse the bearing to compensate for said deviations in the radial clearance.

10. The guide bearing system of claim 9, wherein the first plane is a horizontal plane and wherein the second plane is tangential to the horizontal plane.

11. The guide bearing system of claim 9, wherein the bearing pad assembly further comprises a spacer engaging a back side of the hearing pad, and wherein the spacer encompasses the pad end of the pad adjuster.

12. The guide bearing system of claim 9, wherein the pad adjuster is configured to move the bearing pad along a radial plane defined by a center of rotation of the shaft assembly, wherein the radial plane is coextensive with, the first plane.

13. The guide bearing system of claim 9, wherein the gearing system includes a worm screw engaging a worm wheel, wherein the prime mover assembly is configured to transfer the motive force to the gearing system, wherein the pad adjuster engages the gearing system, wherein the bearing pad assembly comprises the bearing pad having a shaft side distally disposed from a back side, wherein the pad end of the pad adjuster engages the bearing pad assembly, and wherein a proximity sensor is configured to generate the distance signal comprising a distance of the radial clearance.

14. The guide bearing system of claim 13, further comprising a mechanical transmission assembly disposed between the prime mover and the gearing system and engaging the prime mover and the gearing system, wherein the mechanical transmission assembly is configured to transfer the motive force from the prime mover to the gearing system.

15. The guide bearing system of claim 14, wherein the mechanical transmission assembly is selected from the group consisting of a chain and sprockets, a circular rack and pinion gears, and a lever action and gears.

\* \* \* \* \*

UNITED STATES PATENT AND TRADEMARK OFFICE
CERTIFICATE OF CORRECTION

PATENT NO. : 10,961,977 B2
APPLICATION NO. : 16/664153
DATED : March 30, 2021
INVENTOR(S) : Sarmad Elahi et al.

It is certified that error appears in the above-identified patent and that said Letters Patent is hereby corrected as shown below:

In the Claims

In Column 21, Line 39, in Claim 1, delete "measuring," and insert -- measuring --.

In Column 21, Line 59, in Claim 1, delete "radial," and insert -- radial --.

In Column 21, Line 63, in Claim 3, delete "of," and insert -- of --.

In Column 21, Line 67, in Claim 4, delete "drive shaft." and insert -- driveshaft. --.

In Column 22, Line 2, in Claim 5, delete "chain," and insert -- chain --.

In Column 22, Line 53, in Claim 12, delete "with," and insert -- with --.

Signed and Sealed this
Thirteenth Day of June, 2023

Katherine Kelly Vidal
*Director of the United States Patent and Trademark Office*